Figure 1:
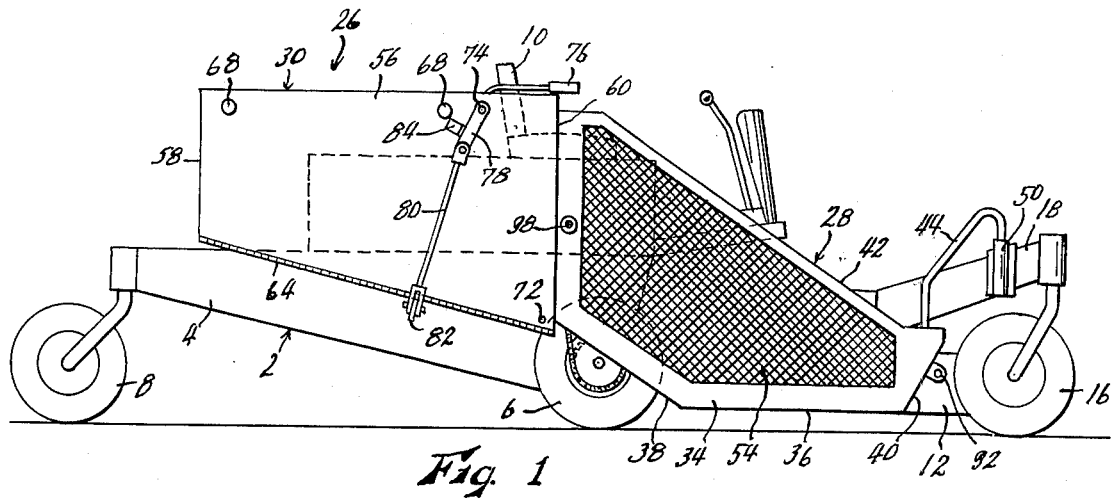

United States Patent [19]

Mullet et al.

[11] 4,069,649
[45] Jan. 24, 1978

[54] GRASS AND LEAF COLLECTOR AND COMPACTOR ATTACHMENT FOR MOWERS

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 677,408

[22] Filed: Apr. 15, 1976

[51] Int. Cl.² .......................................... A01D 35/22
[52] U.S. Cl. .......................................... 56/202; 56/6; 56/14.5; 56/503
[58] Field of Search .................. 56/202, 320.2, 503, 56/6, 13.6, 14.5, 203, 206, 344, 364, 341, 157; 198/737, 740, 741; 130/22 R

[56] References Cited

U.S. PATENT DOCUMENTS

| | | | |
|---|---|---|---|
| 651,300 | 6/1900 | Culbertson | 130/22 R |
| 1,340,798 | 5/1920 | Scott | 56/206 X |
| 2,572,180 | 10/1951 | Morrison | 56/344 X |
| 3,134,214 | 5/1964 | Shaw | 56/202 |
| 3,222,853 | 12/1965 | Michael | 56/202 |
| 3,736,736 | 6/1973 | Myers | 56/202 X |
| 3,791,118 | 2/1974 | Behrens | 56/202 |

*Primary Examiner*—Jay N. Eskovitz
*Attorney, Agent, or Firm*—John A. Hamilton

[57] ABSTRACT

A grass and leaf collector and compactor attachment for lawn mowers consisting of a chute adapted to be mounted at the side of a mower hood to receive mower cuttings ejected from the hood in the lower end thereof, and chute angling upwardly into a hopper also adapted to be mounted on the mower, and one or more paddle bars extending generally longitudinally through the chute and having paddles secured transversely thereto at intervals along their lengths. The paddle bars are driven in vertical orbital paths by suitable connection to a ground-engaging drive wheel of the mower, so as to impel cuttings received in the lower end of the chute upwardly through the chute into the hopper. The hopper is at a sufficient elevation above ground level that its contents may be dumped by dropping the floor thereof.

6 Claims, 5 Drawing Figures

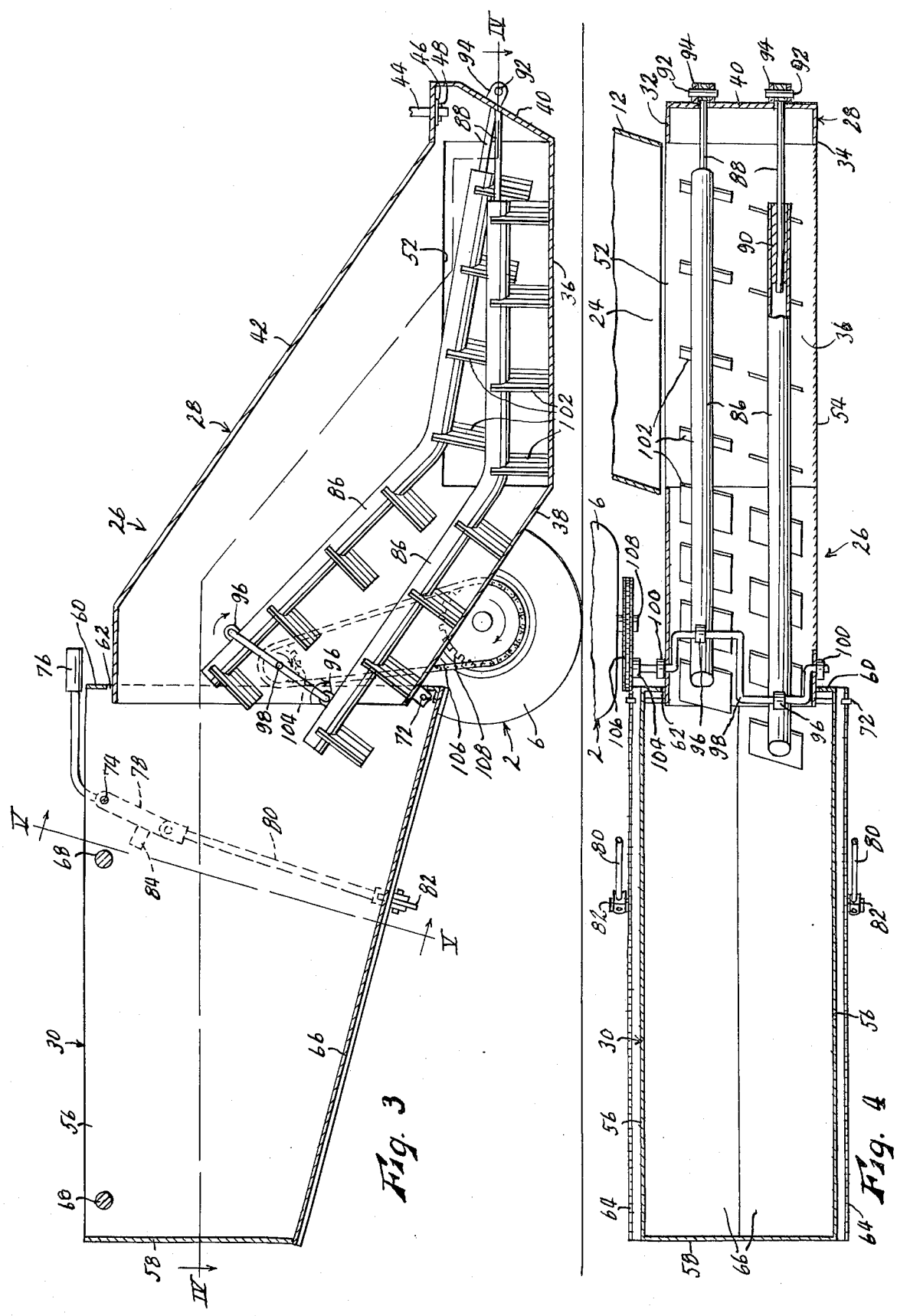

GRASS AND LEAF COLLECTOR AND COMPACTOR ATTACHMENT FOR MOWERS

This invention relates to new and useful improvements in power mowers for large lawns and the like, and has particular reference to a grass or cuttings catcher and collector attachment for such mowers.

There is an ever increasing demand for lawn mower attachments, particularly for large, self-propelled mowers, which will collect, store, and permit remote disposal of the grass cuttings, leaves, and the like thrown up from the ground by the mower action, and several attachments for this purpose have been offered. However, all such devices within our knowledge have been subject to certain shortcomings and disadvantages. Most of such devices have involved the use of a large, powerful "vacuum cleaner" device, including a high-capacity, power driven blower, operable to suck the cuttings emerging from beneath the mower hood into a conduit or tube, and to deliver them through said conduit to a "collection box" from which the air may escape through apertures too small to pass the cuttings, so that the collection box gradually fills with said cuttings. The disadvantages of this prior concept are both noise and dust pollution of the surrounding areas, in that blowers sufficiently powerful to perform effectively are virtually inevitably quite noisy, producing a loud roaring noise, and in that the high volume of air which must be continuously exhausted to the surrounding atmosphere often contains large quantities of dust.

Accordingly, the primary objective of the present invention is the provision of catcher and collector for cuttings ejected from a mower which is not subject to the noise and dust pollution characteristics of prior devices in that it almost totally independent of high velocity air currents to impel the cuttings into the collection hopper.

Another object is the provision of a device of the general character described in which the cuttings are received in one end of a chute connected at its opposite end into the hopper, said cuttings being impelled through the chute into the hopper by one or more "paddle bars" extending longitudinally through the chute and having transversely arranged paddles secured thereto at intervals along their lengths. The paddle bars are moved by suitable power means in a vertical orbital path. Said paddle bars move rearwardly in the lower portions of their orbits, whereby to move said cuttings mechanically along the chute into the hopper.

Another object is the provision of a device of the general character described wherein the paddle bar, or bars, are driven in vertical orbital paths by a simple connection thereof to a ground-engaging drive wheel of the mower itself, thereby eliminating any necessity of a separate prime mover for operating the attachment.

A further object is the provision of a device of the general character described wherein, while the cuttings receiving end of the chute is and must be disposed close to ground level, said hopper is spaced well above ground level, whereby its contents may be dumped simply by opening the bottom thereof.

A still further object is the provision of a device of the general character described which is capable of compacting the cuttings within the hopper with sufficient tightness that they can, if desired, be tied in bale form.

Other objects are simplicity and economy of construction, and efficiency and dependability of operation.

Figure 2:
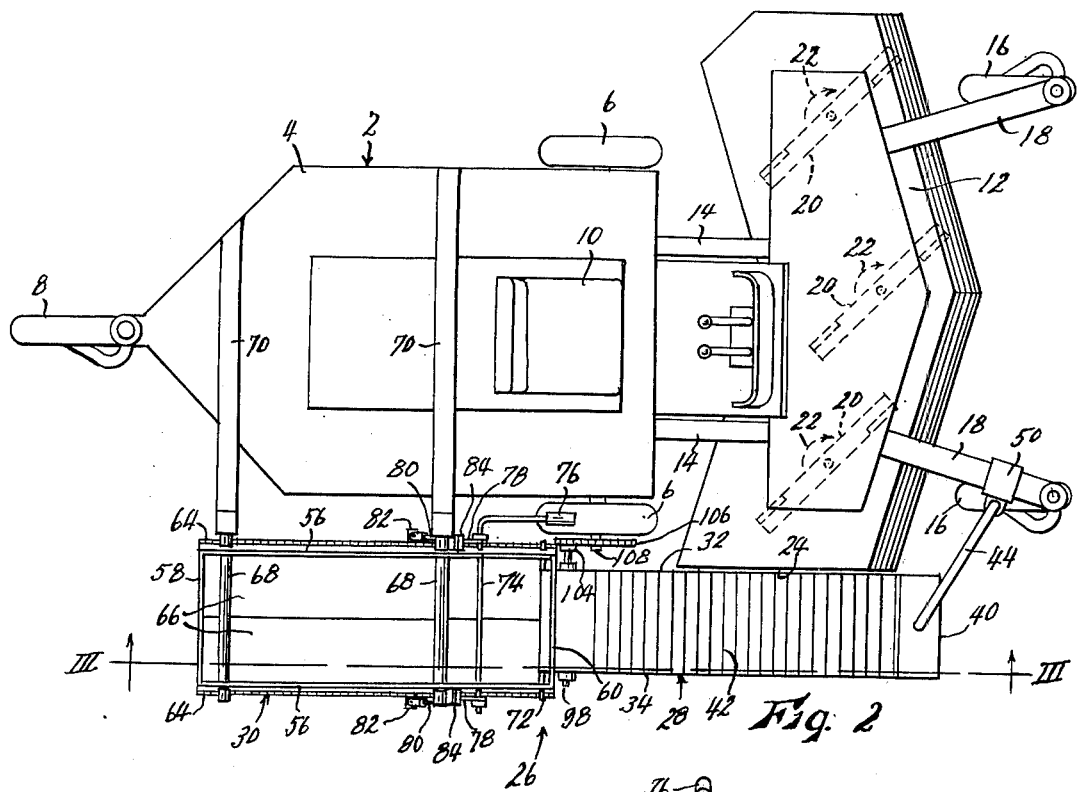
Figure 5:
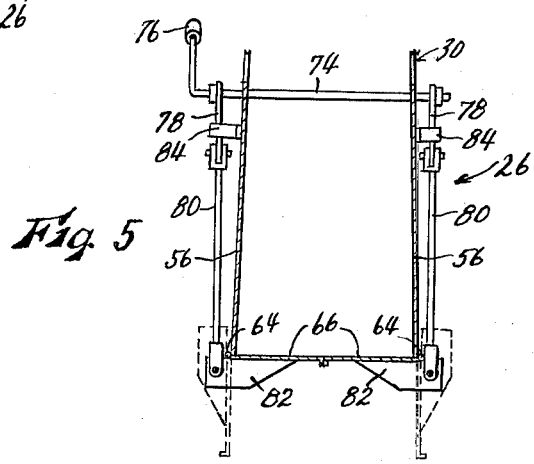

With these objects in view, as well as other objects which will appear in the course of the specification, reference will be had to the accompanying drawing, wherein:

FIG. 1 is a side elevational view of a power mower showing a grass and leaf collection embodying the present invention operatively mounted thereon, FIG. 2 is a top plan view of the elements as shown in FIG. 1, FIG. 3 is an enlarged sectional view taken on line III—III of FIG. 2, FIG. 4 is a somewhat irregular sectional view taken on line IV—IV of FIG. 3, and FIG. 5 is a reduced sectional view taken on line V—V of FIG. 3, showing the hopper bottom doors closed in solid lines and open in dotted lines.

Like reference numerals apply to similar parts throughout the several views, and the numeral 2 applies generally to a self-propelled, power driven mower of a not uncommon type. Said mower includes a body 4 supported at its foward end by a pair of ground-engaging drive wheels 6 disposed respectively at opposite sides thereof, and at its rearward end by a castered ground-engaging central wheel 8. Said body carries a power plant, not shown, controlled by an operator sitting on seat 10 to turn wheels 6 to propel the mower. The mower is steered by turning wheels 6 at unequal rates. Disposed forwardly of body 4 is downwardly opening mower hood 12, said hood being connected to body 4 by vertically pivotable levers 14 (see FIG. 2), and supported slightly above ground level by a pair of castered ground-engaging wheels 16 disposed fowardly thereof and adjacent respectively opposite sides thereof, each of wheels 16 being carried by a boom 18 affixed to and extending forwardly from hood 12. Wheels 16 maintain the hood at a generally uniform elevation above ground level, even on uneven terrain, by allowing levers 14 to pivot vertically relative to body 4.

Disposed beneath hood 12 are one or more rotary blades 20, as indicated in FIG. 2, each blade being carried by the hood for rotation about a vertical axis at its midpoint, and being rotatably driven in the direction of arrows 22 by the power plant carried by body 4, there being a driving connection therebetween, not shown, whereby to cut the grass of the ground over which the hood is advanced at a uniform elevation above ground level.

This showing and description of mower 2 is of course sketchy and incomplete, but further details thereof are not pertinent to the present invention. Virtually all mowers of this type tend to throw the cuttings severed by the blades, as well as leaves, twigs and other debris sucked up from the ground by the upward air currents generated by rotation of the blades laterally to one side of hood 12, that side thereof toward which the forward ends of blades 20 move as said blades rotate. This causes a general characteristic of such mowers of depositing the cuttings in a "windrow" along one side of the path of travel of the mower, if the cuttings are not collected and removed. This is not a desirable characteristic, since the windrows" are not only unsightly, particularly after the material dries and turns brown, but also since they may be so thick and deep as actually to inhibit further growth of the lawn therebeneath. As shown, mower 2 expels the cuttings from under the hood at the right side, when facing forwardly, which is to the right as viewed in FIGS. 1-4. As shown in FIG. 4, the right side of hood 12 is completely open, as indicated at 24.

The collector and compactor attachment forming the subject matter of the present invention is indicated generally by the numeral 26, and includes a chute 28 and a hopper 30, although other receptacles in the nature of flexible bags could be used in place of the hopper, disposed in respectively fore and aft relation along the right side of the mower. Chute 28 includes an inner side wall 32 and an outer side wall 34, both vertically disposed in spaced apart relation, a floor the forward portion 36 of which is horizontal and the rearward portion 38 of which is inclined upwardly and rearwardly, a front wall 40 of abbreviated height rising from the forward end of floor section 36, and a top wall 42 the major portion of which is inclined upwardly and rearwardly, generally parallel to rear floor section 38. The forward end of the chute is supported by a hanger rod 44 extending downwardly through top wall 42 closely adjacent its forward end and secured therein by a washer 46 and cotter pin 48 (see FIG. 3). The opposite end of the hanger rod is mounted in a bracket 50 secured to the boom 18 of one of front mower wheels 16. This mounting permits vertical pivoting of the chute.

Floor section 36 of the chute is thus supported in closely spaced relation above ground level, with inner side wall 32 of the chute closely adjacent or against the right side of hood 12, as best shown in FIG. 2, said side wall having an aperture 52 formed therein (see FIGS. 3 and 4) which registers generally with the side opening 24 of the hood. The outer side wall 34 of the chute, or a major portion thereof, is formed of screening, expanded metal or the like, as indicated at 54, to permit free passage of air, but not cuttings, therethrough.

Hopper 30 has side walls 56 which are slightly downwardly divergent, a rear wall 58, a front wall 60 having an opening 62 into which the rearward open end of chute 28 projects loosely, and an upwardly and rearwardly inclined floor consisting of a pair of doors 66 normally meeting at the longitudinal midline of the hopper and hinged at their distal edges respectively to the lower edges of side walls 56, as indicated at 64. The hopper is supported by a pair of horizontal transverse bars 68 extending through the top edge portions of side walls 56, respectively adjacent the front and rear of the hopper, said bars being carried by brackets 70 affixed to mower body 4. The open rearward end of chute 28 extends into opening 62 of front hopper wall 60, and is secured therein at its lower edge by a pivot ing 72 extending transversely between and journalled in hopper side walls 56. Thus when hood 12 is raised or lowered relative to the mower body, as permitted by hood levers 14, the chute is free to pivot relative to the hopper.

The hopper bottom doors 66 may be opened or closed by means including a horizontal transverse rod 74 extending across the hopper adjacent its top and journalled in hopper side walls 56. Said rod may be turned by means of a right angled handle 76 at one end thereof, said handle being freely accessible to the operator occupying seat 10. At each side of the hopper, a crank 78 is affixed to rod 74, the free end of said crank being connected by a rigid, pivoted link 80 to a bracket 82 affixed to the bottom hopper door 66 at that side of the hopper. The pivotal connection of the link to the bracket is eccentric to the hinge 64 of the associated door. Thus by turning handle 76 in opposite directions, doors 66 may be moved between a closed position, as shown in solid lines in FIG. 5, and an open position as shown in dotted lines. As cranks 78 are turned to a position to close the doors, and move slightly past a deadcenter position relative to links 80, they engage stop members 84 affixed to side walls 56 of the hopper. Thus the doors 66 are securely retained in their closed position.

Disposed in chute 28 are one or more (two shown) paddle bars 86. Said paddle bars may constitute tubular pipes, and extend longitudinally of chute 28 through substantially the entire length thereof. Each is angled intermediate its ends, its forward and rearward end portions being angled in the same degree as the forward and rearward portions 36–38 of the chute floor. At the forward end of each a guide rod 88 extends axially and slidably therein, being slidable in a bearing 90 fixed in said paddle bar. Both of said guide rods extends forwardly through front wall 40 of the chute, and each is pivoted on a horizontal transverse axis, as at 92, in a bracket 94 fixed exteriorly to said front wall. Thus the paddle bars may be pivoted vertically about pivots 92. Adjacent its rearward end, each paddle bar is provided with a bearing 96 in which is rotatably engaged one throw of a double-throw crankshaft 98, said crankshaft extending horizontally and transversely through the chute adjacent its rearward end, and being journalled in bearings 100 carried by chute side walls 32 and 34. The throws of the crankshaft are 180° out of phase. Thus as the crankshaft is turned, the paddle bars, or more accurately each point of each paddle bar, is moved in an orbital path lying in a vertical plane. Affixed to each paddle bar are a series of planar sheet metal paddles 102, said paddles being spaced regularly along the paddle bars, being arranged generally transverse to the axis of the paddle bar. For reasons to appear, it is preferred that the spacing betweeen each successive pair of paddles be somewhat less than the total throw of crankshaft 98. As will appear, crankshaft 98 turns in a clockwise direction as viewed in FIG. 3. Also, paddles 102 extend downwardly from the paddle bars. Thus, as each paddle bar is moved in its vertical orbital path as described, it moves forwardly in the upper portion of its orbit, and rearwardly in the lower portion of its orbit. The parts are so proportioned that during the rearward movement of the paddle bars the lower edges of the paddles sweep either in actual contact with floor 36–38 of the chute, or in very close proximity thereto. Also for a reason to be described, each paddle 102 is inclined horizontally to the axis of its paddle bar, in a direction outwardly and rearwardly relative to the mower, as clearly shown in FIG. 4.

Crankshaft 98 extends toward the mower from chute 28, and has a sprocket wheel 104 fixed on the outer end thereof, said sprocket wheel being operatively connected by means of an endless sprocket chain 106 to a second sprocket wheel 108 mounted coaxially and fixedly on the right drive wheel 6 of the mower.

In operation, it will be seen that whenever mower 2 is driven to propel it over the ground, drive wheel 6 will act through sprocket 108, chain 106, sprocket 104 and crankshaft 98 to move paddle bars 88 and their paddles 102 in the vertical orbital path as described. When the mower is propelled forwardly, as in moving, the direction of the orbital path will be as desired, that is, clockwise as viewed in FIG 3. Then, as grass is cut by mower blades 20, and the cuttings, leaves, twigs and other debris are thrown to the right through right side opening 24 of the mower hood, they enter the lower end portion of chute 28 through opening 52 of side wall 32 of the chute, and are forced rearwardly and upwardly through the chute and into hopper 30 with a step-like motion, by paddles 102, as the paddle bars are driven in the described orbital paths, the paddles sequentially moving downwardly to engage the cuttings resting on chute floor, then rearwardly to force said cuttings rearwardly, then upwardly to disengage the cuttings, and then forwardly while out of engagement with the cuttings. To provide a smoother, more continuous movement of the cuttings through the chute, it is preferred that the spacing between successive paddles be less than the total throw of crankshaft 98. With this provision, each paddle may engage and advance the cuttings advanced by the next forward paddle during the next previous orbit. This provides an efficient, rapid transfer of the cuttings. A greater spacing of the paddles would still be functional, although it would permit accumulation of cuttings in the chute to a greater depth. The use of two "half-width" paddle bars, rather than a single paddle bar with paddles of substantially the full width of the chute, is also effective in producing a more rapid and efficient movement of the cuttings through the chute, in that double the number of rearward impulses are delivered to the cuttings for the same forward movement of the mower. It also tends to prevent forward sliding of the cuttings along inclined portion 38 of the chute floor. However, models of the device using only a single paddle bar, as described, have also been tested and found quite serviceable in most cases.

Of course, the mower is moving forwardly at the slowest rate when cutting the heaviest stands of grasses, under usual circumstances. This would result in a condition in which the chute receives the cuttings at a maximum volumetric rate, while at the same time the paddle bars would be operating at their slowest speed, since they are driven by a drive wheel 6 of the mower, which in turn is rotating at its slowest rate. To prevent this occurrence, sprocket wheels 108 and 104 are relatively sized to rotate crankshaft 98 at a faster rate than drive wheel 6. In this manner, the paddle bars are caused to operate at a speed sufficient to handle the heaviest volume of cuttings at the slowest forward speed of the mower. The higher paddle bar speeds at greater forward speeds of the mower have not been found detrimental. A ratio of 2 to 1 between sprockets 108 and 104 has been found ample in the device as shown, although this is of course a matter of choice and experimentation. Sprocket 104 may be secured to crankshaft 98 by a yieldable shear pin, in order to prevent damage to the parts in the event a rock or other hard object should become lodged between the paddles and the floor of the chute.

The cuttings entering the lower end of the chute are entrained in a substantial current of air, generated by the mower blades 20 themselves. Most of this air is dissipated through the opposite screen wall 54 of the chute, although the cuttings cannot pass through this wall. In this manner, any great blast of air through the chute to the hopper, which might blow the cuttings out of the open top of the hopper, is prevented. Nevertheless, some slight rearward current of air through the chute has been found useful in preventing possible jamming of the cuttings in the chute. This comparatively slight "draft" is provided by the horizontal inclination of paddles 102 in the direction of travel of the cuttings through the chute. This inclination causes them to deflect a portion of the air received from the mower hood rearwardly through the chute.

Cuttings delivered to hopper 30 by the paddle bars collect in the hopper, and when they appear at the top of the hopper, the operator drives the mower to a suitable disposal point and elevates handle 76 to open bottom doors 66 and dump the cuttings. The comparatively high elevation of the hopper above the ground, as compared to the forward end of the chute, provides sufficient ground clearance to permit dumping in this manner. The upward and rearward inclination of the hopper floor also facilitates dumping, since the mower is usually moving forwardly when dumping occurs. The downward and outward divergence of hopper side walls 56 is also helpful in permitting gravity discharge of the hopper load, in view of the fact that the paddles are fully capable of packing the cuttings into the hopper to such a great density that the load might otherwise "hang" in the hopper even when bottom doors 66 are open. In fact, the load density can be so great that if the load is removed intact, it may be tied to form a fully cohesive bale, which may be desirable for further convenience of disposal. A bale tying arrangement is in fact projected as a future improvement in the device, but forms no part of the present invention.

While we have shown and described a specific embodiment of our invention, it will be readily apparent that many minor changes of structure and operation could be made without departing from the spirit of the invention.

What we claim as new and desire to protect by Letters Patent is:

1. In combination with a power propelled mower having cutting blades disposed beneath a hood and operable to eject cuttings through a side opening of said hood, an attachment for collecting said cuttings comprising:
    a. a hollow chute attached to said mower at the side thereof, having a side opening generally registering with the side opening of said hood to receive said cuttings therein, and being elongated rearwardly from said side opening,
    b. a receptacle supported by said mower rearwardly of said chute, and into which the open rearward end of said chute projects, and
    c. power operated mechanical impelling means disposed within said chute and operable when driven to impel cuttings rearwardly from said chute side opening, through said chute and into said receptacle, said impelling means comprising a paddle bar extending generally longitudinally through said chute and a series of paddles affixed to said paddle bar generally transversely thereof, and in spaced relation along the length of said paddle bar, the rearmost of said paddles being disposed generally in the open rearward end of said chute, mounting means for said paddle bar whereby it may be pivoted vertically about a horizontal transverse axis at the forward end of said chute, and moved longitudinally of itself within said chute, said mounting means comprising a guide rod pivoted at its forward end in the forward end of said chute on a horizontal transverse axis, and extending rearwardly in said chute, said paddle bar being mounted for coaxial sliding movement on said guide rod, and means connecting a point of said paddle bar spaced rearwardly from the pivot of said guide rod to a power-driven member having an orbital path lying in a vertical plane, and power-operated means for moving said member, whereby said paddles sweep rearwardly along the floor of said chute in the lower portions of their orbits, and move forwardly in spaced relation above said chute floor in the upper portions of their orbits.

2. The collecting attachment as recited in claim 1 including a pair of said guide rods, paddle bars and series of paddles, disposed in horizontally spaced side-by-side relation within said chute, and wherein said power operated means is operable to move the respective paddle bars in vertical orbital paths 180° out of phase with each other.

3. The collecting attachment as recited in claim 1 wherein said power operated means comprises:
   a. a crankshaft having an eccentric throw extending horizontally and transversely through said chute adjacent the rearward end of said paddle bar, said paddle bar being rotatably attached to said crankshaft throw, and
   b. power means operable to rotate said crankshaft.

4. The collecting attachment as recited in claim 2 wherein said power operated means comprises:
   a. a horizontal crankshaft carried rotatably by said chute adjacent the rearward ends of said paddle bars, said crankshaft having a pair of diametrically opposite eccentric throws, each of said paddle bars being rotatably attached to one of said crankshaft throws, and
   b. power means operable to rotate said crankshaft.

5. The collecting attachment as recited in claim 3 wherein said power means for rotating said crankshaft comprises means operatively connecting said crankshaft to a power driven element of said mower, whereby the former is turned by rotation of the latter.

6. The collecting attachment as recited in claim 3 wherein said power means for rotating said crankshaft comprises:
   a. a first sprocket wheel fixed on said crankshaft,
   b. a second sprocket wheel affixed to a ground-engaging drive wheel of said mower concentrically and coaxially therewith, and
   c. a sprocket chain operatively interconnecting said first and second sprocket wheels.

* * * * *